(12) United States Patent
Huque et al.

(10) Patent No.: US 9,219,745 B2
(45) Date of Patent: Dec. 22, 2015

(54) ASSESSING THE RESISTANCE OF A SECURITY MODULE AGAINST ATTACKS BY COMMUNICATION PIPE DIVERSION

(75) Inventors: Thierry Huque, Grand-Rosiere (BE); Olivier Van Nieuwenhuyze, Wezembeek-Oppem (BE)

(73) Assignee: PROTON WORLD INTERNATIONAL N.V., Zaventem (BE)

( * ) Notice: Subject to any disclaimer, the term of this patent is extended or adjusted under 35 U.S.C. 154(b) by 150 days.

(21) Appl. No.: 14/009,330

(22) PCT Filed: Mar. 26, 2012

(86) PCT No.: PCT/EP2012/055312
§ 371 (c)(1),
(2), (4) Date: Oct. 23, 2013

(87) PCT Pub. No.: WO2012/136501
PCT Pub. Date: Oct. 11, 2012

(65) Prior Publication Data
US 2014/0041036 A1    Feb. 6, 2014

(30) Foreign Application Priority Data
Apr. 5, 2011 (FR) ..................................... 11 52921

(51) Int. Cl.
*H04L 29/06* (2006.01)
*H04W 12/12* (2009.01)
*H04W 24/06* (2009.01)

(52) U.S. Cl.
CPC ........ *H04L 63/1433* (2013.01); *H04L 63/0492* (2013.01); *H04W 12/12* (2013.01); *H04W 24/06* (2013.01)

(58) Field of Classification Search
CPC ... H04L 3/1433; H04L 3/0492; H04W 12/12; H04W 24/06
See application file for complete search history.

(56) References Cited

U.S. PATENT DOCUMENTS

| 6,070,243 A | 5/2000 | See et al. |
| 6,092,191 A | 7/2000 | Shimbo et al. |

(Continued)

FOREIGN PATENT DOCUMENTS

| CN | 1596018 A | 3/2005 |
| CN | 1933351 A | 3/2007 |

(Continued)

OTHER PUBLICATIONS

English language translation of Written Opinion of the International Searching Authority dated Oct. 17, 2013 from corresponding International Application No. PCT/EP2012/055312.

(Continued)

*Primary Examiner* — Willliam Goodchild
(74) *Attorney, Agent, or Firm* — Seed IP Law Group PLLC

(57) ABSTRACT

A method for assessing the resistance of a security module against an attempt to divert a communication pipe between a gate of this security module and a gate of a near-field communication router present in a telecommunication device to which the security module is intended to be connected, including the steps of: connecting the security module to a near-field communication router emulator; having the emulator send at least one command to the security module, this command simulating the fact that the pipe used is not connected to a near-field communication gate; and determining whether the security module accepts the commands.

15 Claims, 4 Drawing Sheets

(56) References Cited

U.S. PATENT DOCUMENTS

| | | | |
|---|---|---|---|
| 7,974,536 | B2 | 7/2011 | Yu et al. |
| 2004/0023220 | A1 | 2/2004 | Greenfield et al. |
| 2004/0065735 | A1 | 4/2004 | Christoffers et al. |
| 2004/0232220 | A1* | 11/2004 | Beenau et al. ......... G01D 21/00 235/380 |
| 2005/0013310 | A1 | 1/2005 | Banker et al. |
| 2007/0263596 | A1 | 11/2007 | Charrat |
| 2008/0085001 | A1 | 4/2008 | Charrat et al. |
| 2008/0219444 | A1 | 9/2008 | Benteo et al. |
| 2008/0296978 | A1 | 12/2008 | Finkenzeller et al. |
| 2009/0106824 | A1 | 4/2009 | Morel et al. |
| 2009/0206984 | A1 | 8/2009 | Charrat et al. |
| 2010/0084465 | A1 | 4/2010 | Jolivet |
| 2010/0090805 | A1 | 4/2010 | Llbotte |
| 2010/0137025 | A1 | 6/2010 | Tal et al. |
| 2010/0161403 | A1 | 6/2010 | Fisher et al. |
| 2010/0178867 | A1 | 7/2010 | Charrat |
| 2010/0178868 | A1 | 7/2010 | Charrat |
| 2010/0210300 | A1 | 8/2010 | Rizzo et al. |
| 2010/0227553 | A1* | 9/2010 | Charrat et al. ............... 455/41.1 |
| 2010/0245054 | A1 | 9/2010 | Kim |
| 2010/0259216 | A1 | 10/2010 | Capomaggio |
| 2011/0065398 | A1 | 3/2011 | Liu et al. |
| 2011/0226853 | A1 | 9/2011 | Soh et al. |
| 2011/0237190 | A1 | 9/2011 | Jolivet |
| 2011/0269423 | A1 | 11/2011 | Schell et al. |
| 2012/0052801 | A1 | 3/2012 | Kulkarni |
| 2012/0190299 | A1 | 7/2012 | Takatsuka et al. |
| 2012/0190332 | A1 | 7/2012 | Charles |
| 2013/0057640 | A1 | 3/2013 | Callahan |
| 2013/0059563 | A1 | 3/2013 | Huque et al. |
| 2013/0059566 | A1 | 3/2013 | Huque et al. |
| 2013/0059567 | A1 | 3/2013 | Huque et al. |
| 2013/0059568 | A1 | 3/2013 | Huque et al. |
| 2013/0217325 | A1 | 8/2013 | Ingels |
| 2013/0225125 | A1 | 8/2013 | Hugue et al. |
| 2013/0337770 | A1 | 12/2013 | Huque et al. |
| 2014/0201815 | A1 | 7/2014 | Van Nieuwenhuyze et al. |
| 2014/0289833 | A1 | 9/2014 | Briceno et al. |

FOREIGN PATENT DOCUMENTS

| | | |
|---|---|---|
| CN | 101079013 A | 11/2007 |
| CN | 101202621 A | 6/2008 |
| CN | 101491052 A | 7/2009 |
| CN | 101536008 A | 9/2009 |
| EP | 1 909 431 A1 | 4/2008 |
| EP | 1 928 099 A1 | 6/2008 |
| EP | 2 034 705 A1 | 3/2009 |
| EP | 2 219 353 A1 | 8/2010 |
| FR | 2 921 786 A1 | 4/2009 |
| WO | 2007/068993 A1 | 6/2007 |
| WO | 2007/093580 A1 | 8/2007 |
| WO | 2009/115997 A2 | 9/2009 |
| WO | 2009/147094 A1 | 12/2009 |

OTHER PUBLICATIONS

International Search Report dated Jun. 6, 2012 from corresponding International Application No. PCT/EP2012/055312.
*Smart Cards; Test specification for the Host Controller Interface (HCI); Part 2: UICC features (Release 7)*, Technical Specification, European Telecommunications Standards Institute (ETSI), 650, Route Des Lucioles; F-06921 Sophia-Antipolis; France, vol. SCP Test, No. V7.2.0, Oct. 1, 2010, XP014061388.
*Smart Cards; UICC—Contactless Front-end (CLF) Interface; Host Controller Interface (HCI) (Release 10)*, Technical Specification, European Telecommunications Standards Institute (ETSI), 650, Route Des Lucioles ; F-06921 Sophia-Antipolis; France, vol. SCP TEC, No. V10.2.0, Mar. 1, 2011, XP014064616.
Gerald Madlmayr et al: "Management of Multiple Cards in NFC-Devices", Sep. 8, 2008, Smart Card Research and Advanced Applications; [Lecture Notes in Computer Science], Springer Berlin Heidelberg, Berlin, Heidelberg, pp. 149-161, XP019104509, ISBN: 978-3-540-85892-8.
ETSI TS 102 622, "Smart Cards; UICC—Contactless Front-end (CLF) Interface; Host Controller Interface (HCI) (Release 7)," V7.4.0, Technical Specification, Apr. 2009, 53 pages.
ETSI TS 102 622, "Smart Cards; UICC—Contactless Front-end (CLF) Interface; Host Controller Interface (HCI) (Release 7)," V7.5.0, Technical Specification, Jun. 2009, 53 pages.
Francis et al., "Potential Misuse of NFC Enabled Mobile Phones with Embedded Security Elements as Contactless Attack Platforms," The Institute of Electrical and Electronics Engineers, Inc., 2009, 8 pages.
French Search Report, dated Oct. 19, 2010, for French Application No. 1051693, 6 pages.
French Search Report, dated Oct. 21, 2010, for French Application No. 1051694, 7 pages.
French Search Report, dated Oct. 11, 2010, for French Application No. 1051695, 7 pages.
French Search Report, dated Nov. 23, 2010, for French Application No. 1051696, 7 pages.
French Search Report, dated May 4, 2011, for French Application No. 1060819, 6 pages.
International Search Report, mailed Apr. 6, 2011, for International Application No. PCT/EP2011/052899, 2 pages.
International Search Report, mailed Apr. 19, 2011, for International Application No. PCT/EP2011/052902, 2 pages.
International Search Report, mailed May 19, 2011, for International Application No. PCT/EP2011/052907, 3 pages.
International Search Report, mailed Jun. 8, 2011, for International Application No. PCT/EP2011/052930, 3 pages.
International Search Report, mailed Mar. 23, 2012, for International Application No. PCT/FR2011/053023, 4 pages.
International Search Report, mailed Jul. 12, 2012, for International Application No. PCT/FR2012/050762, 3 pages.
International Search Report and Written Opinion, mailed Nov. 28, 2011, for International Application No. PCT/EP2011/064639, 14 pages.
International Search Report and Written Opinion, mailed Jan. 25, 2012, for International Application No. PCT/EP2011/064643, 25 pages.
Madlmayr et al., "NFC Devices: Security and Privacy," The Third International Conference on Availability, Reliability and Security, pp. 642-647, 2008. (6 pages).
Pasquet et al., "Payment with mobile NFC phones—How to analyze the security problems," 2008 International Symposium on Collaborative Technologies and Systems (CTS 2008), 8 pages.
Rieback et al., "Keep on Blocking in the Free World: Personal Access Control for Low-Cost RFID Tags," LNCS 4631, Security Protocols 2005, pp. 51-59. (10 pages).
Written Opinion, mailed Mar. 9, 2010, for International Application No. PCT/EP2011/052899, 8 pages.
Written Opinion, mailed Apr. 19, 2011, for International Application No. PCT/EP2011/052902, 6 pages.
Written Opinion, mailed May 19, 2011, for International Application No. PCT/EP2011/052907, 8 pages.
Written Opinion, mailed Jun. 8, 2011, for International Application No. PCT/EP2011/052930, 8 pages.
Written Opinion, mailed Mar. 23, 2012, for International Application No. PCT/FR2011/053023, 6 pages.
Written Opinion, mailed Jul. 12, 2012, for International Application No. PCT/FR2012/050762, 5 pages.

* cited by examiner

ASSESSING THE RESISTANCE OF A SECURITY MODULE AGAINST ATTACKS BY COMMUNICATION PIPE DIVERSION

CROSS REFERENCE TO RELATED APPLICATIONS

This application is the U.S. National Stage of international patent application number PCT/EP2012/055312, filed on Mar. 26, 2012, which claims the priority benefit of French patent application number 11/52921, filed on Apr. 5, 2011, which applications are hereby incorporated by reference to the maximum extent allowable by law.

BACKGROUND

1. Technical Field

Embodiments generally relate to transactions performed by means of a mobile telecommunication device of cell phone type.

Embodiments more specifically apply to the assessment of the resistance of such a device, further equipped with a near field communication circuit (NFC), against attacks where communication pipes between this circuit and a security module of the device are attempted to be diverted.

2. Discussion of the Related Art

Cell phones are more and more often equipped with a near-field communication interface which enables them to combine electromagnetic transponder functions with mobile telephony functions. In particular, this adds functions of emulation of an electromagnetic transponder, of contactless or contactless card reader type to the mobile telecommunication device, for example a personal digital assistant, a cell phone, a smartphone, etc. This considerably enhances the features of the mobile device, which can then be used, for example, as an electronic purse, as an access or transport ticket validation device, etc.

To emulate the operation of a contactless chip card, the mobile telecommunication device is equipped with a contactless front-end integrated circuit (CLF), also called an NFC router. This router is equipped with a radio frequency (RF) transceiver front head associated with a low-range antenna to communicate like an electromagnetic transponder. The router uses the capacities of the processor(s) of the mobile device for data processing and storage operations. For access control, electronic purse, payment, and other applications, a secure element enabling to authenticate the user is used. This secure element is either integrated to the mobile telecommunication device (dedicated integrated circuit, circuit welded to the printed circuit board) or contained in a microcircuit supported by a subscriber identification module (SIM), or any other removable card, for example at the standard format of a memory card.

An NFC router may also be present in a mobile device of USB key type, in a bank teller terminal, in an adhesive device (sticker), etc.

A contactless card emulation in a mobile telecommunication device is capable of generating weak points in terms of transaction security.

It would be desirable to test the resistance of a mobile telecommunication device security module regarding such weak points.

SUMMARY

An embodiment provides a method for assessing the resistance of a security module against an attempt to divert a communication pipe between a gate of this security module and a gate of a near-field communication router present in a telecommunication device to which the security module is intended to be connected, comprising the steps of:

(a) connecting the security module to a near-field communication router emulator;

(b) having the emulator send at least one command to the security module, this command simulating the fact that the pipe used is not connected to a near-field communication gate; and (c) determining whether the security module accepts this command.

According to an embodiment, said command simulates an attempt of pipe diversion between a gate of the security module and a gate of the near-field communication router.

According to an embodiment, the step is preceded by at least one step during which the emulator sends to the security module commands corresponding to a normal use of the near-field router.

Another embodiment provides a system for assessing the resistance of a security module against an attempt to divert a communication pipe between a gate of this security module and a gate of a near-field communication router.

The foregoing and other objects, features, and advantages will be discussed in detail in the following non-limiting description of specific embodiments in connection with the accompanying drawings.

DETAILED DESCRIPTION

Figure 1:
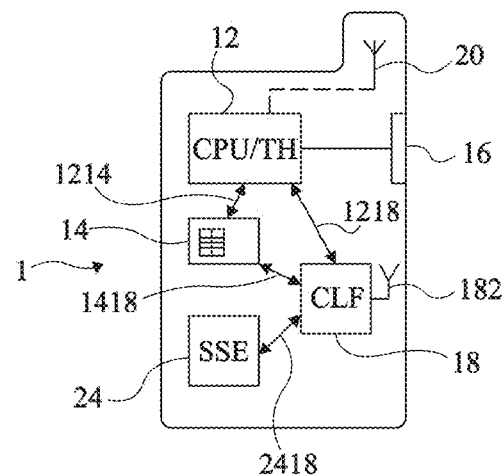
FIG. 1 schematically shows a mobile telecommunication device.

The same elements have been designated with the same reference numerals in the different drawings. For clarity, only those elements and steps which are useful to the understanding of the embodiments have been shown and will be described. In particular, the coding and communication protocols, be it for near-field transmissions or for telecommunications in GSM mode, have not been detailed, embodiments being compatible with usual protocols. Further, the circuits forming the mobile communication device have not been detailed either, embodiments being here again compatible with usual programmable devices.

FIG. 1 very schematically shows a mobile telecommunication device (for example, a cell phone) of the type to which embodiments apply as an example. The different elements of interface with the user (keyboard, display, speakers, etc.) have not been shown, since these elements are not modified by the implementation of the embodiments which will be described.

Device 1 comprises a central processing unit 12 (CPU/TH) formed of at least one microcontroller forming the device core. This microcontroller is called a terminal host. For the telecommunication operation over a network (GSM, 3G, UMTS, etc.), the microcontroller uses identification and authentication data provided by a subscriber identification module 14 (SIM) which forms a security module of the device. Microcontroller 12 is capable of using one or several internal memories, not shown, of the telephone. Telephone 1 may also comprise a memory card reader 16 or other buses of communication with the outside to load data and/or applications into the telephone.

Mobile devices to which the described embodiments apply combine the telecommunication function with that of a near-field contactless transmission system (NFC). To achieve this, device 1 comprises a circuit 18 (CLF) forming a near-field communication module, like an electromagnetic transponder. Module 18, also called NFC router, is associated with an antenna 182 distinct from an antenna 20 intended for the mobile telephony network. Circuit 18 may be associated with a security module (SSE) 24 distinct from SIM card 14 and directly present on the printed circuit board of the telephone, or supported by a removable microcircuit card (for example, in the format of a memory card). A security module is an electronic circuit for securely executing applications, guaranteeing the security (secret/integrity) of data manipulated by such applications.

The different elements of device 1 communicate according to various protocols. For example, circuits 12 and 18 communicate over a link 1218 of I2C (or SPI) type, SIM card 14 communicates with microcontroller 12 over a link 1214 according to ISO standard 7816-3, and security module 24 communicates with router 18 according to this standard over a link 2418. Router 18 communicates with the SIM card, for example, over a single-wire bus 1418 (SWP—Single Wire Protocol). Other versions of protocols and links are of course possible.

The embodiments will be described in relation with a GSM telephone. Embodiments, however, more generally applies to any telecommunication device adapted to a mobile network (for example, Wifi, Bluetooth, WiMax, etc.) and associated with a contactless transmission module (NFC router), for example, a USB key, a bank terminal, a power consumption meter, or others), an access or transport ticket validation terminal, etc.

Similarly, the near-field communication module will be called router since it generally integrates all the functions useful for the emulation of a contactless card within the same circuit, the described embodiments however applying to any NFC-type module.

Router 18 comprises physical terminals of connection to links 1218, 1418, and 2418 and manages logic gates for assigning these terminals to the different functions associated with near-field communications. Router 18 thus comprises a processor and volatile and non-volatile memories for storing, among others, a routing table for the different logic gates. Some gates are reserved for router administration functions while others can be freely assigned by the router.

In operation, router 18 makes available and manages different pipes of communication with the other circuits 12, 14, 24, etc. of the mobile device to give them access to the near-field communication functions, that is, to gates connected to radio frequency transmission circuits, called radio frequency or RF gates.

Figure 2:
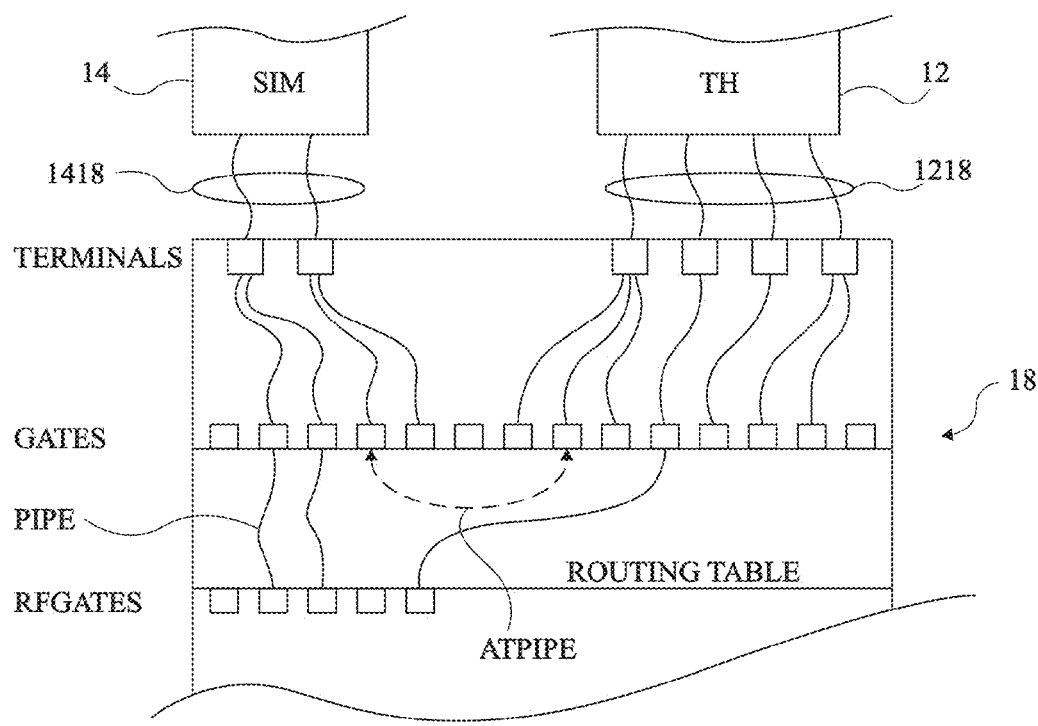
FIG. 2 is a diagram illustrating a function of a near-field transmission module of the device of FIG. 1.

FIG. 2 very schematically illustrates, in the form of blocks, the routing function of router 18. For simplification, FIG. 2 is a structural representation while, in practice, the assignment of the different gates to the different circuits of the mobile device is a software operation performed by the routing table.

Each of the router terminals (TERMINALS) is assigned one or several gates (GATES). In the example of FIG. 2, it is assumed that physical links 1418 and 1218 of SIM card 14 and of microcontroller 12 are connected to terminals of router 18 and that gates are assigned to these circuits. Several gates may be assigned to a same circuit (which is symbolized in FIG. 2 by the connection of a same terminal to several gates). The routing table (ROUTING TABLE) of router 18 assigns some gates to internal functions (for example, configuration and administration functions), but also creates pipes (PIPE) between gates assigned to the SIM card or to the RF microcontroller, and gates (RFGATES) comprised in module 18. This corresponds to the creation of pipes (PIPE) between the circuits external to routers 18 and these RF transmission circuits for the implementation of the different applications requiring a near-field communication. For example, in bank, transport, electronic purse, access, and other applications which require a secure identification or authentication of the user, one or several pipes are created between the router and the SIM card to use the secure user identification data and validate the transaction.

The integration of NFC routers in mobile telecommunication devices and the sharing of a same security module (SIM card or other) generate weak points in terms of security.

Authentication tools may be provided to make sure that the links between the router and the different external circuits are not pirated. However, this appears to be insufficient in view of a weak point that the present inventors have identified and which will be described hereafter.

Router or NFC module 18 generally is a single integrated circuit and its external accesses are rather well protected against possible hacking attempts.

Up to now, the main concern has been to guarantee that a near-field transaction emulated by the mobile device would not enable a pirate device intercepting the near-field communication to exploit the information provided by the security module.

However, there remains a risk, since router 18 also manages a pipe (ATPIPE, symbolized in dotted lines in FIG. 2) of communication between SIM card 14 or any other security module and microcontroller 12 of the mobile telecommunication device. This pipe is normally used so that SIM card 14 informs microcontroller 12 that a message reaches it over the NFC link. It is however also possible to divert this use to make security module 14 believe that it communicates with the router for a near-field transaction, and thus over a pipe with the RF gates of the telephone, while it is actually communicating with microcontroller 12.

Figure 3:
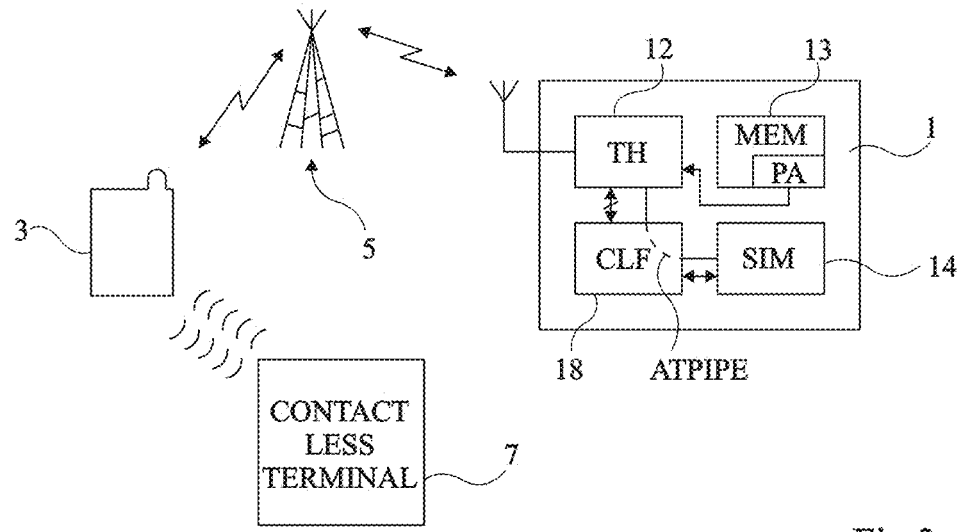
FIG. 3 very schematically illustrates an attack capable of exploiting a weakness of the telecommunication device of FIG. 1.

FIG. 3 very schematically illustrates, in the form of blocks, the possible use of a pipe ATPIPE between a SIM card 14 and a microcontroller 12 of a cell phone 1.

It is assumed that, in a preparatory phase of the attack, GSM phone 1 has been hacked and a pipe ATPIPE has been diverted via router 18 between its SIM card 14 and its microcontroller 12. The routing table of router 18 thus contains the data of the "diverted" pipe. It is also assumed that a pirate application (PA) has been stored in a memory 13 (non volatile) of phone 1 and that this application may provide instructions to microcontroller 12. Several embodiments of the preparatory phase will be discussed subsequently.

The user of device 1, once it has been hacked by the loading of application PA and by the creation of pipe ATPIPE, is not capable, as will be seen hereafter, to notice a malfunction. He uses his telephone normally.

One of the functions of application PA is to automatically trigger a response of phone 1 after a request originating from the telecommunication network and transmitted by another mobile device 3 owned by the attacker. The pirate device for example is another GSM phone 3 which uses its own subscriber identification module to communicate over the GSM network (symbolized by a relay antenna 5). It may also be a microcomputer associated with a GSM module.

In the example of FIG. 3, device 3 is also equipped with a contactless router, for example, to initiate near field transactions with a terminal 7 (for example, an NFC terminal or any other contactless communication terminal). For example, device 3 is used to make a purchase with a payment to be validated by its NFC router.

Normally, for such a payment, the router of telephone 3 manages a communication pipe with the subscriber identification module (or any other dedicated security module) of this telephone to authenticate the user and validate the payment.

Figure 4:
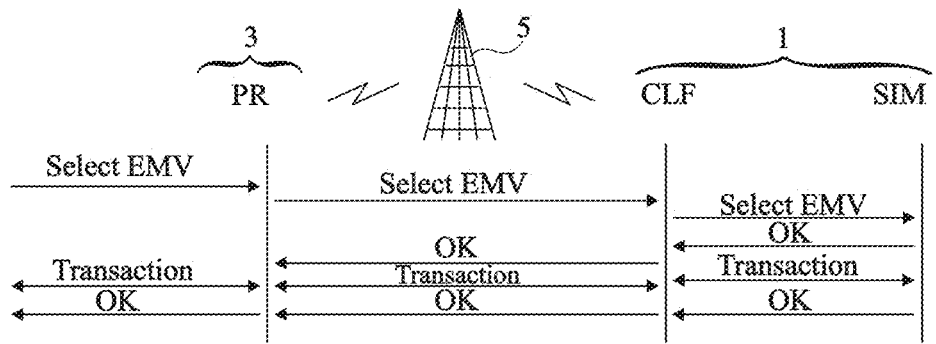
FIG. 4 illustrates an example of how an attack applied to the EMV payment standard develops.

FIG. 4 illustrates an example of exchange at the time of the payment validation in a mechanism such as illustrated in FIG. 3.

Telephone 3 or pirate device PR receives, from its NFC module, a payment validation request. Such a request is, for example, supported by an application according to the EMV standard (Eurocard-Mastercard-Visa). The NFC router of telephone 3 thus receives an instruction of selection of its EMV application (SELECT EMV). Instead of using its own security module, telephone 3 uses GSM network 5 to ask distant telephone 1 to validate the payment by means of subscriber identification module 14. For example, device 3 sends an SMS over network 5 which, when received by telephone 1, is processed by the pirate application. This SMS, for example, contains an instruction of selection of the EMV application (SELECT EMV). On the side of telephone 1, the pirate application simulates the requests originating from the RF gate and uses microcontroller 12 to transmit these requests to router 18 (CLF) which forwards them over pipe ATPIPE to identification module 14 (SIM). The latter thus receives instruction SELECT EMV and validates the selection of the EMV application. This validation is diverted by the pirate application executed on microcontroller 12 and returned to device 3. The obtaining, by the pirate device, of the validation of application EMV of security module 18 of device 1 is exploited by its NFC router to communicate with payment terminal 7. The entire payment transaction is conveyed by this pirated pipe until the payment validation (OK) by the SIM card of telephone 1 transmitted by the GSM network, and then by telephone 3 to terminal 7. As a result, the payment is debited to the subscriber of telephone 1 and not to the attacker who owns device 3. Most often, a contactless application requires no interaction with the terminal (7, FIG. 3) except for a presentation of the contactless device. In particular, no code (PIN) keying is required for a near-field communication to avoid lengthening transactions, whereby device 3 may easily hack distant device 1.

The countermeasures providing encryptions and/or signatures between terminal 7 requesting the authentication and the security module are ineffective to counter this attack. Indeed, the data between terminal 7 and module 14 need no decoding. A communication pipe has actually been established between module 14 of telephone 1 and terminal 7 via telecommunication network 5, so that module 14 behaves as if it was in near field transaction with terminal 7.

The same type of piracy may occur for passage authentication or validation applications, of secure access type.

Further, this attack may also be successful even without for pirate device 3 to use its own NFC router, for example, if it uses a contactless communication mode, provided that the requested authentication originates from a security module and respects the formats and protocols used by the NFC protocol. Further, such an attack may be used to divert any data from device 1 in favor of a pirate system (for example, data duplicating the content of the magnetic track of a card in a bank payment application).

Further, the attack may involve the SIM card of cell phone 1 or of any other security module (for example, module 24, FIG. 1), provided for the pipe to be managed by router 18 between this module and a circuit (generally, microcontroller 12) capable of managing communications over network 5.

Such a near-field transaction attack, exploiting the telecommunication network, is due to the presence of a communication pipe, via the NFC router, between the security module and a microcontroller connected to this router.

Implementing the attack requires a preparatory phase in which an intervention of the telephone 1 which is desired to be pirated is necessary.

This preparation requires an intervention depending on the security level provided by the SIM card to the management of the NFC communication pipes.

In a simplified embodiment, the microcontroller is allowed to create a pipe on any free gate. In this case, a pirate application loaded into the microcontroller is capable of creating a pipe through the NFC router to the SIM card. If, afterwards, the SIM card performs no other checking than to acknowledge that the format of the requests corresponds to the format of a radio frequency frame originating from an NFC circuit, the pirate application may attack the SIM card.

According to another embodiment, security module 14 is more advanced and checks the association between the numbers of the pipes or of its own gates and the RF gates.

In the first case, it is considered that SIM card 14 does not take into account the circuit with which the gate is created (and thus, the fact that it may be a gate intended for the microcontroller). This embodiment uses the fact that the assignment of the pipe numbers (identifiers) is often sequential. It is first started by asking the microcontroller to suppress a pipe between the SIM card and the RF gates. Then, a pipe having the same identifier between the microcontroller and the SIM card is created.

Figure 5:
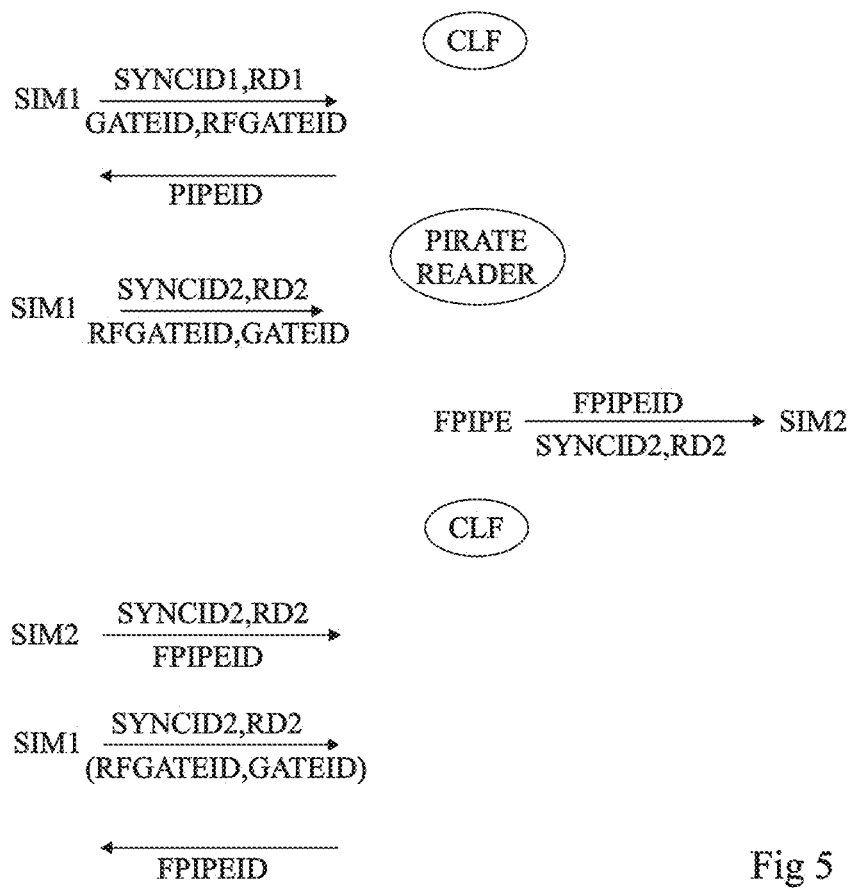
FIG. 5 illustrates an embodiment of a preparatory phase of such an attack.

FIG. 5 illustrates another embodiment of a preparatory phase of the attack aiming at diverting a pipe between router 18 (CLF) and the SIM card (SIM1) of a user. This embodiment is more specifically intended for the second above example where the SIM card makes sure, before transmitting data to the CLF router, that it has effectively controlled the creation of the communication pipe with said router. The fact that, prior to the initialization of device 1, the SIM card verifies whether it has already been in the presence of router 18 is here exploited. If not, the card reconfigures the channels between its gates and the NFC router.

In a normal operation, at the first connection of card SIM1 in telephone 1, the card causes the creating, at the level of a so-called transport layer, of at least one communication pipe, identified as SYNCID1, with the CLF router. For this purpose, card SIM1 sends to the CLF router both synchronization data SYNCID1 and a number (typically, a random number RD1). Number RD1 is stored in the CLF router and is used by card 14 to check that it has already caused the creation of a pipe with this router. On each initialization, the card verifies the existence of number RD1 in the router. To achieve this, the card requests from the router to create a pipe between one of its gates, identified as GATEID, and one of the RF gates, identified as RFGATEID. The router then creates a pipe and assigns it an identifier PIPEID and, at the same time, stores said identifier in the routing table and communicates it to card SIM1. Each time data are requested by the router, card SIM1 verifies that identifier PIPEID of the pipe is correct.

To implement the attack, the hacker should have cell phone 1 and card SIM1 in his possession for a period of time. This is relatively easy, for example, by asking the owner of the cell phone to lend it to supposedly make a call, or by fraudulently using a phone during a maintenance operation, for example, in a mobile telephony shop.

With card SIM1 and the telephone provided with router 1, the pirate starts by introducing card SIM1 into a pirate device (PIRATE READER), for example, another cell phone having a microcontroller capable of executing a piracy program complying with the described functions, or a computer provided with a card reader and simulating a router. Since card SIM1 has never met the NFC router of the pirate device or the router emulated by said device, it generates a new synchronization identifier SYNCID2. It sends back gate identifiers RFGATEID and GATEID to create the corresponding pipes. The pirate router then assigns, to at least one pair of gates, a pipe FPIPEID which corresponds to a gateway between the router and an external gate of the microcontroller instead of associating gate GATEID to an RF gate. Identifier FPIPEID and identifiers RSYNCHID2 and RD2 are then loaded into a falsified card SIM2. Card SIM2 then contains a routing table associating gates RFGATEID and GATEID with pipe FPIPEID.

Then, card SIM2 is introduced into telephone 1. Identifiers SYNCID2 and RD2 are then transferred to CLF router 18 to create pipe FPIPEID between gates designated as GATEID and RFID. This amounts to modifying the routing table of the router so that when the pipe between gates GATEID and RFGATEID is called, the assigned pipe is pipe FPIPEID instead of PIPEID.

The assignment of pipe FPIPEID may take various forms according to the way in which the pipes are assigned to the gates in the router. For example, a phase of observation of the gate assignment is gone through by placing card SIM2 in the router to observe the pipe assignment method, before introducing card SIM2 into the pirate reader.

The "real" card SIM1 is then placed back into telephone 1. Since the CLF router knows identifiers RD2 and SYNCID2, the card considers that it "knows" the router and does not recreate pipes therewith. When card SIM1 requests a communication towards gate RFGATEID, the router uses the assigned pipe FPIPEID.

The GSM terminal has effectively been hacked, that is, a pipe FPIPE (or ATPIPE, FIG. 2) has been created between a gate GATEID of the SIM card and a gate of microcontroller 12, while card SIM1 believes that this pipe connects its gate GATEID to gate RFGATEID. This pipe can then be diverted for a distant access over the GSM network from another terminal (FIG. 3). The downloading of pirate application PA can be performed either subsequently or at the same time as the pirate pipe generation.

There exist various possibilities according to the presented device 1 to access the routing table thereof. For example, the routing table may be read from. If this is not possible, it is possible, when card SIM1 is in the pirate reader, to emulate an operation of the CLF circuit, in order to obtain the full configuration stored in this card. A pirate card SYNC2 or a card emulator may also be used to extract the data from the routing table in phone VALID1.

It can thus be seen that it is possible to parameterize the diverting of a communication pipe between a security module and an NFC router to create a pipe between this module and the telephone microcontroller, external to the NFC router.

In order for the user of telephone 1 not to notice the piracy, even when he uses his contactless mode, the pirate application should comprise the function of redirecting pipe FPIPE towards the RF circuits of the router when a data request towards the SIM card is transmitted by router 18.

Figure 6:
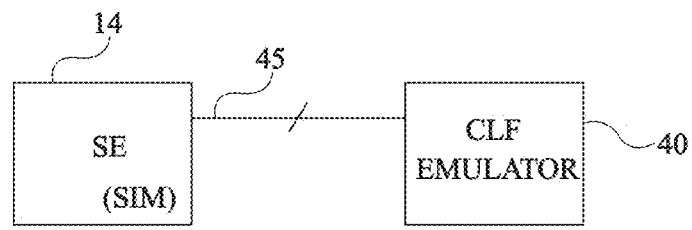
FIG. 6 very schematically shows in the form of blocks an embodiment of a system for assessing the resistance of a security module against pipe diversion attacks.

FIG. 6 very schematically shows, in the form of blocks, an embodiment of a system for assessing the resistance of a security module SE, for example, a SIM card 14, against pipe diversion attacks between this security module and a CLF router. The system comprises a CLF router emulator 40 (CLF EMULATOR) having SIM card 14 connected thereto (connection 45). This emulator has the function of testing the SIM card operation and, more generally, of a security module intended to be associated with a telecommunication device 1 of the type illustrated in FIG. 1, to assess the resistance of this security module against the above-mentioned pipe diversion attacks.

Connection 45 between emulator 40 and security module 14 is of the type of connection 1418 described hereabove in relation with FIGS. 1 and 2.

Figure 7:
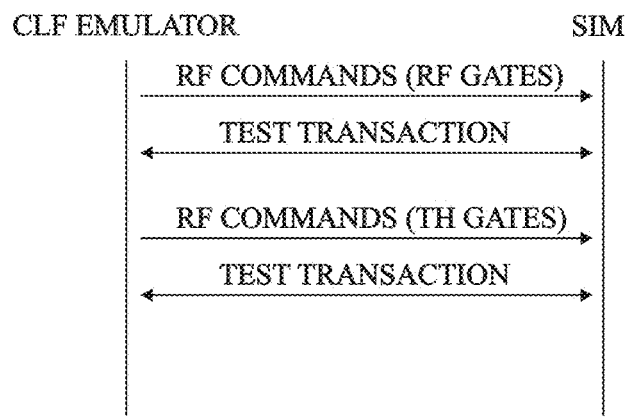
FIG. 7 illustrates an embodiment of a method for testing the resistance of a security module.

FIG. 7 very schematically shows an example of a command likely to be emulated by emulator 40.

Figure 8:
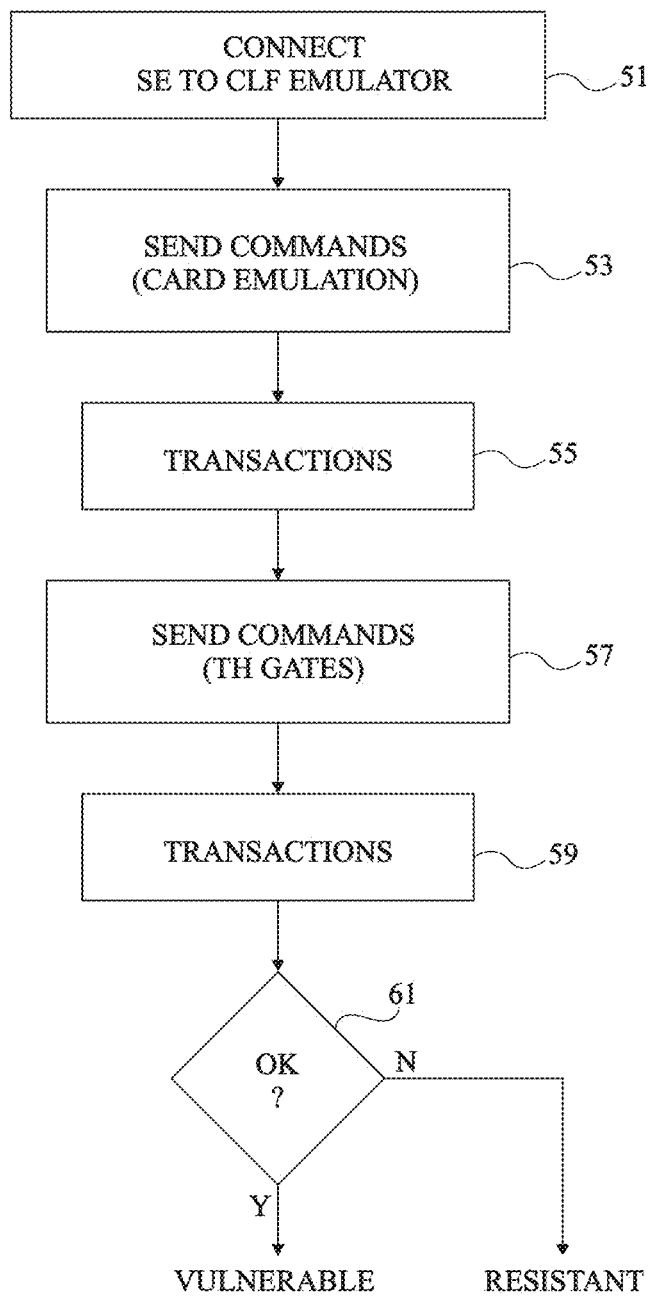
FIG. 8 illustrates, in the form of blocks, steps of an embodiment of a method for assessing the resistance of a security module to a pipe diversion attack.

FIG. 8 is a block diagram illustrating steps of a method for assessing the resistance of the security module to attacks by pipe diversion.

In a first step (block 51, CONNECT SE TO CLF EMULATOR), SIM card 14 is electrically connected (by connection 45) to emulator 40.

In a second step (block 53, SEND COMMANDS (CARD EMULATION)), emulator 40 sends commands to the card while simulating the fact that these commands originate from the CLF router radio frequency interface (RF COMMANDS (RF GATE), FIG. 7). This step is followed by several transactions (block 55, TRANSACTIONS), for example, the simulation of a payment validated by the SIM card. Steps 53 and 55 are optional but aim at making sure that the security module is actually compatible with an operation in a telecommunication device equipped with a CLF router.

Steps 53 and 55 are followed by steps 57 and 59 during which emulator 40 sends commands (SEND COMMANDS) by emulating the fact that the pipe used is not connected to radio frequency gates, but to gates of the central unit of the telecommunication device (TH GATES). The sending of these commands is followed by an attempt to send a transaction (block 59) and with an exchange between the SIM card and the emulator.

According to whether emulator 40 detects (block 61, OK?) a proper operation (output Y of block 61) or a blocking (output N of block 61) by the security module, this means that the card is vulnerable to such attacks (VULNERABLE) or resistant to such attacks (RESISTANT).

As a variation, the assessing of the resistance is performed while the card or other security module is present in the telecommunication device. The resistance assessment steps then comprise simulating an attack of the telecommunication device and more specifically of its security module via the GSM network. A successful attack means that the device is vulnerable. An unsuccessful attack means that the device is resistant to such attacks.

Various embodiments have been described. Various alterations, modifications, and improvements will occur to those skilled in the art. In particular, although embodiments have been described in relation with a SIM card, they more generally apply to the testing of the resistance to attacks by communication pipe diversion of any equivalent security module. Further, the practical implementation of the described embodiments is within the abilities of those skilled in the art based on the functional indications given hereabove and by using tools known per se.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method to assess resistance of a security module against an attempt to divert a communication pipe, the communication pipe established between a first gate and a second gate, the first gate coupled to a security module and the second gate coupled to a near-field communication (NFC) router wherein both the security module and the NFC router are present in a telecommunication device, comprising:
   coupling the security module to an NFC router emulator;
   sending at least one command from the NFC router emulator to the security module, the at least one command simulating a condition wherein the communication pipe is not coupled to the second gate; and
   determining whether the security module accepts the at least one command.

2. The method of claim 1, wherein said at least one command simulates an attempt to divert the communication pipe.

3. The method of claim 1, wherein the act of sending at least one command is preceded by sending a plurality of commands from the NFC router emulator to the security module, the plurality of commands simulating a normal use of the NFC router.

4. A system to assess a security module, comprising:
   a memory;
   a processing unit coupled to the memory, the processing unit arranged to execute instructions stored in the memory;
   a near-field communications (NFC) router;
   a plurality of gates including a first gate coupled to the security module, a second gate coupled to the NFC router, and a third gate coupled to the processing unit;
   a data communication pipe coupling the security module to the NFC router via the first gate of the security module and the second gate of the NFC router; and
   an NFC router emulator configured to send at least one first command to the security module, the at least one first command arranged to simulate a condition wherein the data communication pipe is not coupled between the first gate of the security module and the second gate of the NFC router, the NFC router emulator configured to send at least one second command, the at least one second command arranged to divert the data communication pipe from the second gate of the NFC router to the third gate of the processing unit.

5. The system of claim 4, wherein the NFC router emulator is configured to send a plurality of commands to the security module prior to sending the at least one first command, the plurality of commands simulating a normal use of the NFC router.

6. The system of claim 4, wherein the NFC router emulator is configured to detect a response by the security module to the at least one second command arranged to divert the data communication pipe from the second gate of the NFC router to the third gate of the processing unit, the NFC router emulator further configured to assert a vulnerable status or a resistant status to the security module based on the detected response.

7. The system of claim 4, wherein the NFC router emulator is configured to send at least one third command to the security module, the at least one third command simulating a transaction with an exchange between the security module and the processing unit.

8. The system of claim 7, wherein the NFC router emulator is configured to detect a response by the security module to the at least one third command simulating the transaction with the exchange between the security module and the processing unit, the NFC router emulator further configured to assert a vulnerable status or a resistant status to the security module based on the detected response.

9. A near-field communications (NFC) router emulator, comprising:
   an interface, the interface arranged to connect the NFC router emulator to a security module wherein the security module is configured for association with a telecommunications device having a processing unit, an NFC router, and a plurality of assignable gates, wherein a routing table directs the assignable gates to form a data communication pipe between the NFC router and the security module, and wherein the NFC router emulator is configured to:
      send a first command to the security module, the first command arranged to divert the data communication pipe from the NFC router to the processing unit;
      detect a response by the security module to the first command arranged to divert the data communication pipe from the NFC router to the processing unit; and
      assert a vulnerable status or a resistant status to the security module based on the detected response.

10. The NFC router emulator of claim 9, wherein the NFC router emulator is configured to:
   send a plurality of commands to the security module, the plurality of commands arranged to simulate valid commands from the NFC router to the security module.

11. The NFC router emulator of claim 9, wherein the NFC router emulator is configured to:
   send a second command to the security module, the second command arranged to simulate a transaction with an exchange between the security module and the processing unit;
   detect a response by the security module to the second command; and
   assert the vulnerable status or the resistant status to the security module based on the detected response.

12. A near-field communication (NFC) router emulator method, comprising:
   coupling a security module to the NFC router emulator, the coupling simulating a first condition that the security module is present in a telecommunication device, the coupling simulating a second condition that the telecommunication device is in the presence of an RF field produced by an NFC terminal, the coupling simulating a third condition that an NFC router is coupled to the security module via a data communication pipe, the data communication pipe established according to a routing table;

sending a card emulation command from the NFC router emulator to the security module, the card emulation command simulating a fourth condition that the card emulation command is initiated by the NFC router;
sending a pipe diversion command from the NFC router emulator to the security module, the pipe diversion command directing diversion of the data communication pipe from the NFC router to a processing unit of the telecommunication device; and
detecting whether the security module accepts the pipe diversion command or not.

13. The NFC router emulator method of claim 12, comprising:
based on detecting whether the security module accepted the pipe diversion command or not, assigning a status to the security module of vulnerable or resistant.

14. The NFC router emulator method of claim 12, comprising:
prior to sending the pipe diversion command, sending at least one transaction command, the at least one transaction command simulating a valid transaction between the NFC terminal and the security module through the NFC router.

15. The NFC router emulator method of claim 12, comprising:
after sending the pipe diversion command, sending at least one transaction command, the at least one transaction command simulating a transaction between the processing unit and the security module through the NFC router;
detecting whether the security module followed the at least one transaction command; and
based on detecting whether the security module followed the at least one transaction command or not, assigning a status to the security module of vulnerable or resistant.

* * * * *